US011372762B2

(12) United States Patent
Narsale

(10) Patent No.: US 11,372,762 B2
(45) Date of Patent: Jun. 28, 2022

(54) PREFETCH BUFFER OF MEMORY SUB-SYSTEM

(71) Applicant: Micron Technology, Inc., Boise, ID (US)

(72) Inventor: Ashay Narsale, Newark, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 16/928,729

(22) Filed: Jul. 14, 2020

(65) Prior Publication Data
US 2022/0019535 A1    Jan. 20, 2022

(51) Int. Cl.
*G06F 12/0862*    (2016.01)

(52) U.S. Cl.
CPC .. *G06F 12/0862* (2013.01); *G06F 2212/1021* (2013.01)

(58) Field of Classification Search
CPC .................................................. G06F 12/0862
USPC ......................................................... 711/137
See application file for complete search history.

(56) References Cited

U.S. PATENT DOCUMENTS

| 8,589,632 | B1 | 11/2013 | Gupta et al. |
| 2004/0064649 | A1 | 4/2004 | Volpe et al. |
| 2008/0059715 | A1* | 3/2008 | Tomita ................ G06F 12/0862 711/130 |
| 2008/0183903 | A1 | 7/2008 | Vanstee et al. |
| 2009/0100206 | A1 | 4/2009 | Wang |
| 2011/0314228 | A1* | 12/2011 | Blake .................. G06F 12/0833 711/141 |
| 2012/0159072 | A1 | 6/2012 | Hida et al. |
| 2013/0019065 | A1 | 1/2013 | Floman et al. |
| 2018/0113825 | A1 | 4/2018 | Huggins |
| 2019/0384529 | A1 | 12/2019 | Eliash et al. |
| 2020/0117462 | A1 | 4/2020 | Jin et al. |
| 2022/0019536 | A1 | 1/2022 | Narsale et al. |

FOREIGN PATENT DOCUMENTS

CN            113934666 A        1/2022

* cited by examiner

*Primary Examiner* — Jae U Yu
(74) *Attorney, Agent, or Firm* — Schwegman Lundberg & Woessner, P.A.

(57) ABSTRACT

Various embodiments described herein provide for using a prefetch buffer with a cache of a memory sub-system to store prefetched data (e.g., data prefetched from the cache), which can increase read access or sequential read access of the memory sub-system over that of traditional memory sub-systems.

20 Claims, 10 Drawing Sheets

PREFETCH BUFFER OF MEMORY SUB-SYSTEM

TECHNICAL FIELD

Embodiments of the disclosure relate generally to memory devices, and more specifically, relate to a sequence for a prefetch buffer of a memory sub-system, which can be used with a cache of the memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
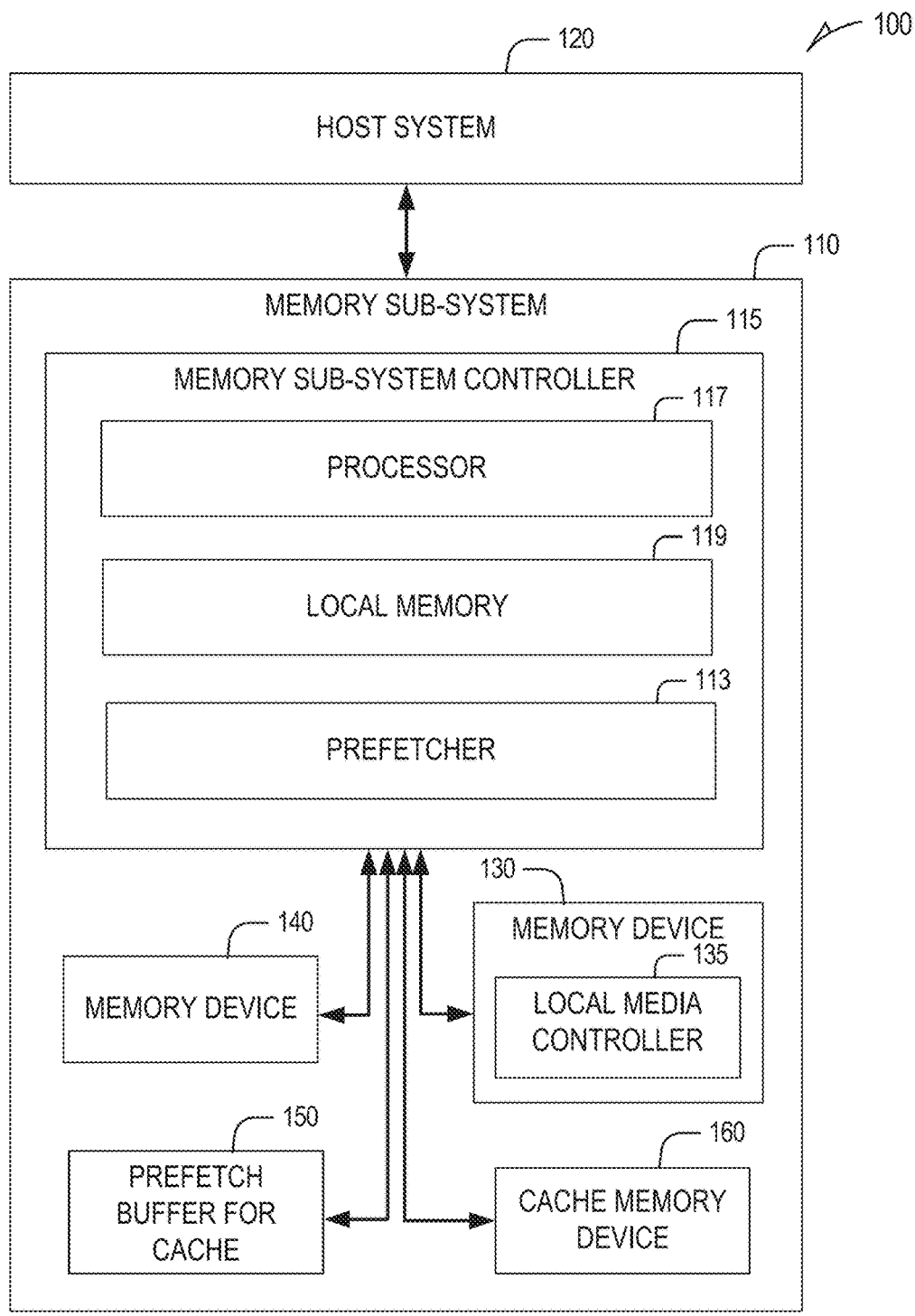
FIG. 1 illustrates an example computing system that includes a memory sub-system, in accordance with some embodiments of the present disclosure.

Aspects of the present disclosure are directed to using a prefetch buffer with a cache of a memory sub-system to store prefetched data (e.g., data prefetched from the cache), which can increase read access or sequential read access of the memory sub-system over that of traditional memory sub-systems. For example, an embodiment can include a memory sub-system that comprises a prefetch buffer (e.g., comprising a static random access memory (SRAM) device), a cache memory device (e.g., a comprising a dynamic random access memory (DRAM) device), and a non-cache memory device (e.g., comprising a NAND-type based memory device), where data stored on the non-cache memory device is cached on the cache memory device, and where data stored on the cache memory device can be prefetched to the prefetch buffer based on (e.g., according to) a prefetch policy. A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can send access requests to the memory sub-system, such as to store data at the memory sub-system and to read data from the memory sub-system.

The host system can send access requests (e.g., write command, read command) to the memory sub-system, such as to store data on a memory device at the memory sub-system and to read data from the memory device on the memory sub-system. The data to be read or written, as specified by a host request, is hereinafter referred to as "host data". A host request can include logical address information (e.g., logical block address (LBA), namespace) for the host data, which is the location the host system associates with the host data. The logical address information (e.g., LBA, namespace) can be part of metadata for the host data. Metadata can also include error handling data (e.g., ECC codeword, parity code), data version (e.g. used to distinguish age of data written), valid bitmap (which LBAs or logical transfer units contain valid data), etc.

The memory sub-system can initiate media management operations, such as a write operation, on host data that is stored on a memory device. For example, firmware of the memory sub-system may re-write previously written host data from a location on a memory device to a new location as part of garbage collection management operations. The data that is re-written, for example as initiated by the firmware, is hereinafter referred to as "garbage collection data."

"User data" hereinafter generally refers to host data and garbage collection data. "System data" hereinafter refers to data that is created and/or maintained by the memory sub-system for performing operations in response to host requests and for media management. Examples of system data include, and are not limited to, system tables (e.g., logical-to-physical address mapping table), data from logging, scratch pad data, etc.

A memory device can be a non-volatile memory device. A non-volatile memory device is a package of one or more die. Each die can be comprised of one or more planes. For some types of non-volatile memory devices (e.g., NAND devices), each plane is comprised of a set of physical blocks. For some memory devices, blocks are the smallest area than can be erased. Each block is comprised of a set of pages. Each page is comprised of a set of memory cells, which store bits of data. The memory devices can be raw memory devices (e.g., NAND), which are managed externally, for example, by an external controller. The memory devices can be managed memory devices (e.g., managed NAND), which is a raw memory device combined with a local embedded controller for memory management within the same memory device package.

To speed up data access (e.g., data read access), a traditional memory sub-system often includes a cache memory device to cache data as a host accesses (e.g., requests a data read or a data write with respect to) a non-cache memory device of the traditional memory sub-system. Generally, the cache memory device can provide faster data access than the non-cache memory device. For example, the non-cache memory device can comprise a non-volatile memory device that provides persistent data storage, such as a NAND-type memory device, and the cache memory device can comprise a volatile memory device such as a DRAM device that provides non-persistent data storage. When a data read request from a host results in a cache hit, the traditional memory sub-system can respond by fetching the data from the cache memory device (e.g., the DRAM device), rather than fetching it from the slower non-cache memory device, and providing the fetched data to the host system.

Aspects of the present disclosure improve data access of a memory sub-system by including a prefetch buffer in the memory sub-system, where the prefetch buffer is effectively placed/used in front of the cache memory device to speed up read accesses of the memory sub-system. According to some embodiments, a prefetch buffer provides of a memory sub-system faster data access (e.g., read access) than a cache memory device of the memory sub-system, and the cache memory device provides faster data access (e.g., read access) than a non-cache memory device of the memory sub-system. For instance, the prefetch buffer can comprise one or more SRAM devices, registers, or set-associative caches, the cache memory devices can comprise one or more DRAM devices, and the non-cache memory devices can comprise one or more NAND-type memory devices. Depending on the embodiment, a non-cache memory device of a memory sub-system can implement a backend, persistent storage of the memory sub-system.

Based on a prefetch policy, a memory sub-system of an embodiment can cause data (e.g., one or more sectors or pages of data) to be prefetched into the prefetch buffer (e.g., from the cache memory device or from the non-cache memory device) prior to any portion of the data being requested for reading by the host system. For example, where a memory sub-system of an embodiment receives a data read request from a host system for a specified memory address, and the data read request results in a read hit on the cache memory device, the memory sub-system can respond by prefetching data from one or more sequential memory addresses that sequentially follow the specified memory address (e.g., prefetch the next 64 bytes of data) from the cache memory device (e.g., the DRAM device) or from the non-cache memory device (e.g., the NAND-type memory device) to the prefetch buffer. In doing so, if the memory sub-system subsequently receives from the host system a data read request for data from at least one of those sequential memory addresses, the data read request would result in a read hit on the prefetch buffer and the memory sub-system can provide the requested data from the prefetch buffer, rather than the cache memory device. For various embodiments, where the prefetch buffer provides faster data access (e.g., read access) than the cache memory device, providing the requested data from the prefetch buffer can result in faster read access (which can also achieve more read bandwidth) than providing the requested data from the cache memory device, especially in situations where the host system is accessing data sequentially (e.g., requesting data reads from sequential memory addresses).

For some embodiments, a prefetch buffer of a memory sub-system is a write-through buffer. Accordingly, when a data write request is received from a host system by the memory sub-system and the data write request results in a write hit on the prefetch buffer, the memory sub-system can cause the data of the data write request to be written to both the prefetch buffer and a cache memory device of the memory sub-system.

As used herein, prefetching data to a prefetch buffer of a memory sub-system can comprise fetching (e.g., copying) data from another memory device (e.g., a cache memory device or a non-cache memory device) of the memory sub-system to the prefetch buffer prior to the memory sub-system receiving a data access request from a host system with respect to that data. For instance, one or more sectors of data (e.g., 128 bytes) can be fetched (e.g., copied) from the cache memory device (e.g., one operating as a sector cache) to the prefetch buffer, or from the non-cache memory device to the prefetch buffer, prior to the memory sub-system receiving a data read request from the host system to explicitly fetch and provide the one more sectors to the host system. In another instance, one or more pages of data (e.g., 64 bytes) can be fetched (e.g., copied) from the cache memory device (e.g., one operating as a page cache) to the prefetch buffer, or from the non-cache memory device to the prefetch buffer, prior to the memory sub-system receiving a data read request from the host system to explicitly fetch and provide the one more pages to the host system.

As used herein, with respect to a data read request (e.g., from a host system to a memory sub-system), a read hit with respect to a prefetch buffer can refer to a condition where the prefetch buffer can satisfy the data read request (e.g., the prefetch buffer is currently storing a valid copy of the data requested by the data read request), and a read miss with respect to the prefetch buffer can refer to a condition where the prefetch buffer cannot satisfy the data read request (e.g., the prefetch buffer is not currently storing a copy of the data requested by the data read request, or the copy is invalid). Similarly, with respect to a data read request (e.g., from a host system to a memory sub-system), a read hit with respect to a cache memory device can refer to a condition where the cache memory device can satisfy the data read request (e.g., the cache memory device is currently storing a valid copy of the data requested by the data read request), and a read miss with respect to the cache memory device can refer to a condition where the cache memory device cannot satisfy the data read request (e.g., the cache memory device is not currently storing a copy of the data requested by the data read request, or the copy is invalid). Additionally, as used herein, write hits and write misses can refer to similar situations for prefetch buffers/cache memory devices, but with respect to data write requests from a host system.

As used herein, a cache memory device can implement a set-associative cache. For instance, a cache memory device of an embodiment can implement an N-way set-associative cache, such as a two-way set-associative cache. Within a cache memory device, hit or miss detection for data associated with a specific memory address can comprise determining a tag based on the specific memory address and an associative search of tags within the cache memory device.

Disclosed herein are some examples of systems for using a prefetch buffer with a cache in a memory sub-system, as described herein.

FIG. 1 illustrates an example computing system 100 that includes a memory sub-system 110, in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, a secure digital (SD) card, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing environment 100 can include a host system 120 that is coupled to one or more memory sub-systems 110. In some embodiments, the host system 120 is coupled to different types of memory sub-systems 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS). Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR). Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) includes a negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as NAND type flash memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

The memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host system, or by a processor or controller separate from the memory sub-system).

In general, the memory sub-system controller 115 can receive commands or operations from the host system 120 and can convert the commands or operations into instructions or appropriate commands to achieve the desired access to the memory devices 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system 120 into command instructions to access the memory devices 130 and/or the memory device 140 as well as convert responses associated with the memory devices 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local media controller 135) for media management within the same memory device package. An example of a managed memory device is a managed NAND (MNAND) device.

The memory sub-system controller 115 includes a prefetcher 113, and the memory sub-system 110 includes a prefetch buffer 150 for cache (hereafter, the prefetch buffer 150) and a cache memory device 160. For some embodiments, one or both of the memory devices 130, 140 operates a non-cache memory device of the memory sub-system 110. For some embodiments, the prefetch buffer 150 provides faster read access than the cache memory device 160. For example, the prefetch buffer 150 can comprise one or more SRAM devices, one or more registers, or one or more set of set-associative caches, and the cache memory device 160 can comprise one or more DRAM devices. Additionally, for some embodiments, the prefetcher 113 enables or facilitates prefetching data to the prefetch buffer 150 according to methodologies described herein.

According to some embodiments, the memory subsystem 110 receives, from the host system 120, a request to read first data from a storage location on one of the memory devices 130, 140 that corresponds to a specified memory address, which can be provided in association with the request. For some embodiments, the prefetcher 113 enables the memory sub-system controller 115 to respond to the request by providing, based on the memory address, the first data to the host system 120 from one of the prefetch buffer 150, the cache memory device 160, or one of the memory devices 130, 140 (serving as a non-cache memory device). For instance, if the request to read the first data results in a read hit with the prefetch buffer 150, the first data can be provided to the host system 120 from the prefetch buffer 150. If the request to read the first data results in a read miss with the prefetch buffer 150, and if the request to read the first data results in a read hit with the cache memory device 160, the first data can be provided to the host system 120 from the cache memory device 160. If the request to read the first data results in a read miss with the prefetch buffer 150, and if the request to read the first data results in a read miss with the cache memory device 160, the first data can be provided to the host system 120 from one of the memory devices 130, 140.

For some embodiments, the prefetcher 113 enables the memory sub-system controller 115 to further respond to the request by determining whether the first data is provided from at least one of the prefetch buffer 150 to the host system 120, the cache memory device 160, or one of the memory devices 130, 140. As noted herein, the prefetch buffer 150 provides the first data to the host system 120 if it is determined that the received request results in a read hit for the prefetch buffer 150. The cache memory device 160 provides the first data to the host system 120 if it is determined that the received request results in a read miss for the prefetch buffer 150 but a read hit for the cache memory device 160. One of the memory devices 130, 140 provides the first data to the host system 120 if it is determined that the received request results in a read miss for the prefetch buffer 150 and a read miss for the cache memory device 160.

For some embodiments, the prefetcher 113 enables the memory sub-system controller 115 to further respond to the request by prefetching second data from the cache memory device 160 to the prefetch buffer 150 based on a prefetch policy and based on determining whether the first data is provided to the host system 120 from at least one of the prefetch buffer 150 or the cache memory device 160. According to various embodiments, the second data (being prefetched to the prefetch buffer 150) is stored on one of the memory devices 130, 140 at a set of storage locations corresponding to a set of sequential memory addresses that sequentially follow the specified memory address. The amount of data (i.e., the size of the second data) prefetched to the prefetch buffer 150 can depend on a depth of prefetch (prefetch depth) setting. The prefetch depth setting can define, for example, the number of sequential memory addresses in the set of sequential memory addresses, which can determine the size of the second data. For some embodiments, the prefetch depth setting can be defined by the prefetch policy, can be predefined, can be defined using one or more registers, or can be dynamically set.

For various embodiments, the prefetch policy defines one or more criteria that, when satisfied, cause the second data to be prefetched to the prefetch buffer 150. For example, the prefetch policy can be defined such that, in response to the first data being provided from the cache memory device 160 (e.g., read miss on the prefetch buffer 150 and read hit on the cache memory device 160) to the host system (e.g., 120), at least the second data can be copied, from a set of storage locations on the set of non-cache memory devices corresponding to the set of sequential memory addresses, to the cache memory device 160. Thereafter, the second data can be copied from the cache memory device 160 to the prefetch buffer 150. In doing so, the second data is prefetched to the prefetch buffer 150. The prefetch policy can be further defined such that in response to the first data being provided from the prefetch buffer 150 (e.g., read hit on the prefetch buffer 150) to the host system (e.g., 120), the second data can be copied from the cache memory device 160 to the prefetch buffer 150. The prefetch policy can be defined such that, in response to the first data being provided from the prefetch buffer 150 (e.g., read hit on the prefetch buffer 150) to the host system (e.g., 120), third data (representing additional prefetch data) can be copied from one of the memory devices 130, 140 (non-cache memory device) to the cache memory device 160. Additionally, the prefetch policy can be defined such that in response to every read request, data from the next address can be prefetched to the prefetch buffer 150 (e.g., copied from the cache memory device 160 to the prefetch buffer 150 after the data is copied from one of the memory devices 130, 140 (non-cache memory device) to the cache memory device 160).

According to some embodiments, the memory sub-system 110 receives, from the host system 120, a request to write first data to a storage location on one of the memory devices 130, 140 that corresponds to a specified memory address, which can be provided in connection with or as part of the request. For some embodiments, the prefetcher 113 enables the memory sub-system controller 115 to respond to the request by determining whether the first data is currently stored on the prefetch buffer 150 (e.g., determining whether the request results in a write hit with the prefetch buffer 150). Additionally, for some embodiments, the prefetcher 113 enables the memory sub-system controller 115 to respond to determining that the first data is currently stored on the prefetch buffer 150 (e.g., determine a write hit exists with the prefetch buffer 150) by writing the first data to at least both the prefetch buffer 150 and the cache memory device 160. Eventually, the memory sub-system controller 115 can cause the first data to be written to one of the memory devices 130, 140 (non-cache memory device).

Though the prefetcher 113 is illustrated as part of the memory sub-system controller 115, for some embodiments the prefetcher 113 can be implemented (at least in part) as a component of the memory sub-system 110 that the is separate from the memory sub-system controller 115.

FIGS. 2 through 5 are flow diagrams of example methods for using a prefetch buffer with a cache memory device of a memory sub-system, in accordance with some embodiments of the present disclosure. The methods 200, 300, 400, 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, at least one of the methods 200, 300, 400, 500 is performed by the memory sub-system controller 115 of FIG. 1 based on the prefetcher 113. Additionally, or alternatively, for some embodiments, at least one of the methods 200, 300, 400, 500 is performed, at least in part, by the local media controller 135 of the memory device 130 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

For some embodiments, one or more of the methods 200, 300, 400, 500 are performed with respect to a memory sub-system (e.g., 110) comprising a set of prefetch buffers (e.g., 150), a set of cache memory devices (e.g., 160), and the set of non-cache memory devices (e.g., 130, 140). The set of cache memory devices can comprise at least one cache memory device for caching one or more sectors from the set of non-cache memory devices (e.g., the at least one cache memory device functions as a sector cache). The set of cache memory devices can comprise at least one cache memory device for caching one or more pages from the set of non-cache memory devices (e.g., the at least one cache memory device functions as a page cache). Additionally, the set of cache memory devices can comprise a set of volatile memory devices, and the set of non-cache memory devices can comprise a set of non-volatile memory devices. For example, the set of prefetch buffers can comprise at least one of a set of SRAM devices, a set of hardware registers, or a set of set-associative caches. In an example, the set of cache memory devices can comprise a set of DRAM devices. In another example, the set of non-cache memory devices can comprise a set of NAND-type memory devices.

Figure 2:
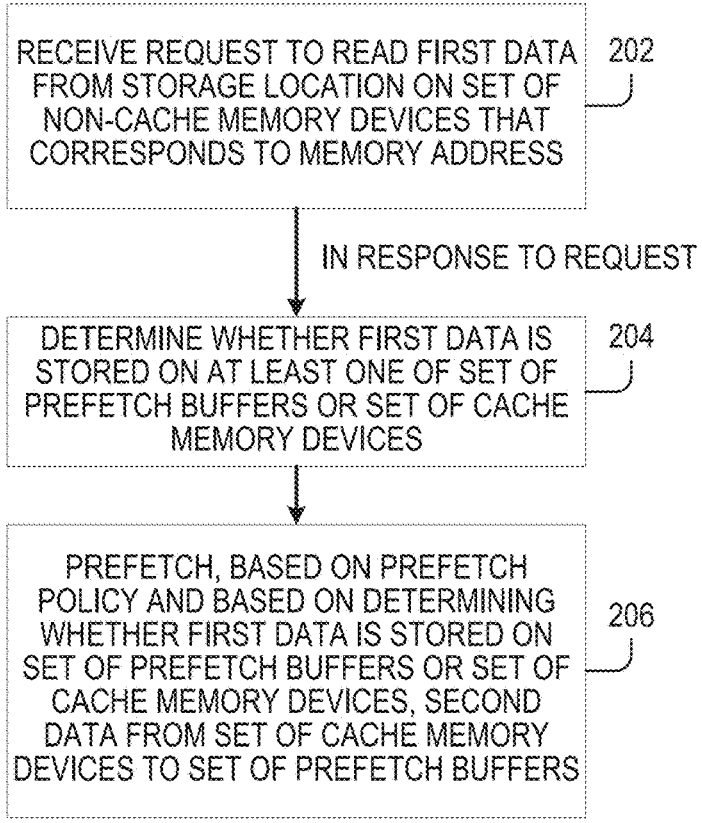
FIGS. 2 through 5 are flow diagrams of example methods for using a prefetch buffer with a cache memory device of a memory sub-system, in accordance with some embodiments of the present disclosure.

Referring now to the method 200 of FIG. 2, at operation 202, a processing device (e.g., the processor 117 of the memory sub-system controller 115) receives, from a host system (e.g., 120), a request to read first data from a storage location on a set of non-cache memory devices (e.g., 130, 140) that corresponds to a memory address. For some embodiments, the memory address is received from the host system in connection with, or as part of, the request received by operation 202.

At operation 204, the processing device (e.g., the processor 117) responds to the request of operation 202 by determining whether the first data is currently stored on the set of prefetch buffers (e.g., determine whether the request results in read hit on the prefetch buffer 150).

At operation 206, the processing device (e.g., the processor 117) prefetches second data from the set of cache memory devices (e.g., 160) to the set of prefetch buffers (e.g., 150) based on a prefetch policy and based on the determination (by operation 204) of whether the first data is stored on the set of prefetch buffers (e.g., 150) or the set of cache memory devices (e.g., 160). According to some embodiments, the second data (prefetched to the set of prefetch buffers) is stored on the set of non-cache memory devices (e.g., 130, 140) at a set of storage locations corresponding to a set of sequential memory addresses, where the set of sequential memory addresses sequentially follows the memory address (associated with the request received by operation 202).

For some embodiments, in response to determining (at operation 204) that the first data is stored on the set of prefetch buffers (e.g., determining that the request results in a read hit on the prefetch buffer 150), the processing device (e.g., the processor 117) prefetches the second data from the set of cache memory devices (e.g., 160) to the set of prefetch buffers (e.g., 150) by copying the second data from the set of cache memory devices (e.g., 160) to the set of prefetch buffers (e.g., 150).

However, at operation 204, the processing device can determine that the first data is not stored on the set of prefetch buffers (e.g., determining that the request results in a read miss on the prefetch buffer 150). In response to this determination, if the processing device determines that the first data is stored on the set of cache memory devices (e.g., determining that the request results in a read hit on the cache memory device 160), the processing device (e.g., the processor 117) can prefetch the second data from the set of cache memory devices (e.g., 160) to the set of prefetch buffers (e.g., 150) by: copying at least the second data, from the set of storage locations on the set of non-cache memory devices (e.g., 130, 140) corresponding to the set of sequential memory addresses, to the set of cache memory devices (e.g., 160); and thereafter, copying the second data from the set of cache memory devices (e.g., 160) to the set of prefetch buffers (e.g., 150) (or alternatively, from the set of non-cache memory devices to the set of prefetch buffers). Additionally, if the processing device determines that the first data is stored on the set of cache memory devices (e.g., determining that the request results in a read hit on the cache memory device 160), the processing device (e.g., the processor 117) can further prefetch third data, from a second set of storage locations on the set of non-cache memory devices (e.g., 130, 140) corresponding to a second set of sequential memory addresses, to the set of cache memory devices (e.g., 160), where the second set of sequential memory addresses sequentially follows the set of sequential memory addresses. In doing so, some embodiments can prefetch a next sequence of data prior to that data being prefetched from the set of cache memory device to the prefetch buffer. More regarding examples of this is discussed with respect to FIGS. 6 and 7.

Figure 3:
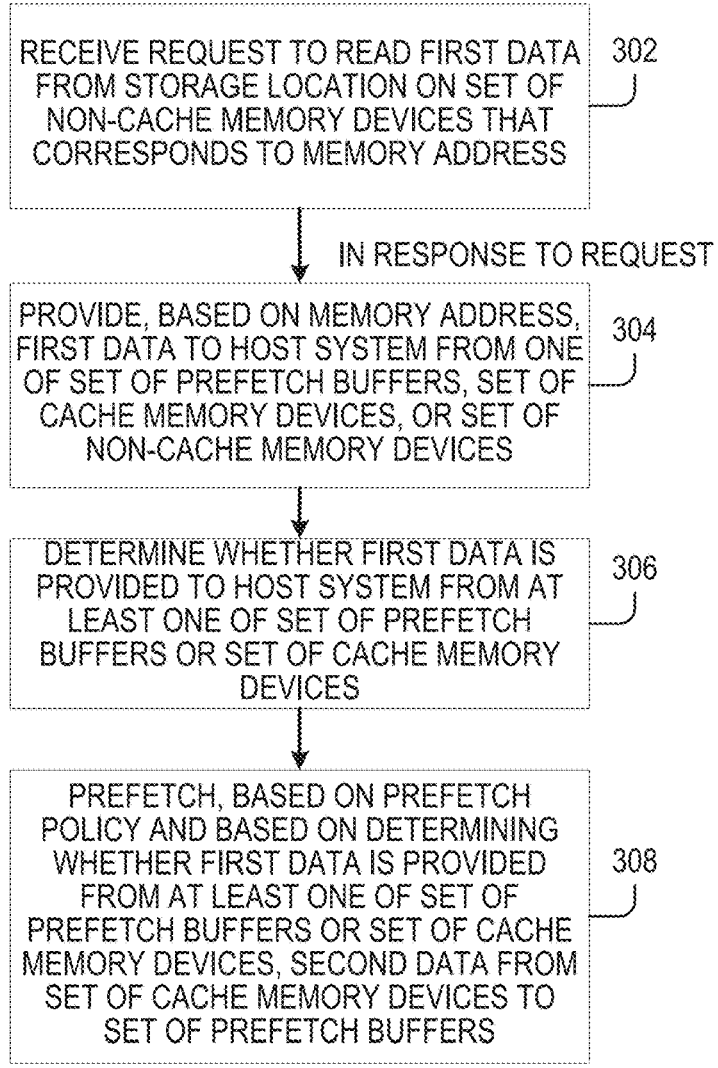

Referring now to the method 300 of FIG. 3, operation 302 is similar to operation 202 described with respect to the method 200 of FIG. 2. At operation 304, the processing device (e.g., the processor 117) responds to the request of operation 302 by providing, based on the memory address, the first data to the host system (e.g., 120) from one of the set of prefetch buffers (e.g., 150), the set of cache memory devices (e.g., 160), or the set of non-cache memory devices (e.g., 130, 140).

For some embodiments, operation 302 comprises: the processing device (e.g., the processor 117) determining, based on the memory address, whether the first data is currently stored on the set of prefetch buffers (e.g., determining whether the request results in a read hit on the prefetch buffer 150); and in response to determining that the first data is currently stored on the set of prefetch buffers, providing the first data from the set of prefetch buffers to the host system (e.g., 120).

For some embodiments, operation 302 comprises: the processing device (e.g., the processor 117) determining, based on the memory address, whether the first data is currently stored on the set of prefetch buffers (e.g., determining whether the request results in a read hit on the prefetch buffer 150); and in response to determining that the first data is not stored on the set of prefetch buffers, determining, based on the memory address, whether the first data is currently stored on the set of cache memory devices (e.g., 160). In response to determining that the first data is currently stored on the set of cache memory devices (e.g., 160), the processing device can provide the first data from the set of cache memory devices (e.g., 160) to the host system (e.g., 120).

In response to determining that the first data is not stored on the set of cache memory devices (e.g., 160), the processing device can fetch the first data from the set of non-cache memory devices (e.g., 130, 140) to the set of cache memory devices (e.g., 160), and provide the first data from the set of cache memory devices (e.g., 130, 140) to the host system (e.g., 120). Additionally, for some embodiments, based on a prefetch policy, the processing device can prefetch data, from a set of storage locations on the set of non-cache memory devices (e.g., 130, 140) corresponding to a set of sequential memory addresses, to the set of cache memory devices, where the set of sequential memory addresses sequentially follows the memory address associated with the request received from the host system (e.g., 120).

Depending on the embodiment, determining (based on the memory address) whether the first data is currently stored on the set of cache memory devices (e.g., 160) can comprise: the processing device (e.g., the processor 117) determining whether the request to read the first data comprises a request to read a sector of data from the storage location on the set of non-cache memory devices (e.g., 130, 140), or determining whether the request to read the first data comprises a request to read a page of data from the storage location on the set of non-cache memory devices (e.g., 130, 140). In response to determining that the request to read the first data comprises a request to read the sector of data from the storage location, the processing device can determine whether the first data is currently stored on a cache memory device, of the set of cache memory devices, for caching one or more sectors from the set of non-cache memory devices. In response to determining that the request to read the first data comprises the request to read the page of data from the storage location, the processing device can determine whether the first data is currently stored on a cache memory device, of the set of cache memory devices, for caching one or more pages from the set of non-cache memory devices.

At operation 306, the processing device (e.g., the processor 117) determines whether the first data is provided (by operation 304) to the host system (e.g., 120) from at least one of the set of prefetch buffers (e.g., 150) or the set of cache memory devices (e.g., 160).

At operation 308, the processing device (e.g., the processor 117) prefetches second data from the set of cache memory devices (e.g., 160) to the set of prefetch buffers (e.g., 150) based on a prefetch policy and based on the determination (by operation 304) of whether the first data is provided from at least one of the set of prefetch buffers (e.g., 150) or the set of cache memory devices (e.g., 160).

For some embodiments, in response to determining (at operation 306) that the first data is provided to the host system (e.g., 120) from the set of prefetch buffers (e.g., 150), the processing device (e.g., the processor 117) prefetches the second data from the set of cache memory devices (e.g., 160) to the set of prefetch buffers (e.g., 150) by copying the second data from the set of cache memory devices (e.g., 160) to the set of prefetch buffers (e.g., 150).

However, at operation 306, the processing device can determine that the first data is provided to the host system (e.g., 120) from the set of cache memory devices (e.g., 160). In response to this determination, the processing device can prefetch the second data from the set of cache memory devices (e.g., 160) to the set of prefetch buffers (e.g., 150) by: copying at least the second data, from the set of storage locations on the set of non-cache memory devices corresponding to the set of sequential memory addresses, to the set of cache memory devices; and copying the second data from the set of cache memory devices to the set of prefetch buffers. Additionally, the processing device can further prefetch third data, from a second set of storage locations on the set of non-cache memory devices (e.g., 130, 140) corresponding to a second set of sequential memory addresses, to the set of cache memory devices (e.g., 160), where the second set of sequential memory addresses sequentially follows the set of sequential memory addresses. In doing so, some embodiments can prefetch a next sequence of data prior to that data being prefetched from the set of cache memory devices to the prefetch buffer. More regarding examples of this is discussed with respect to FIGS. 6 and 7.

Figure 4:
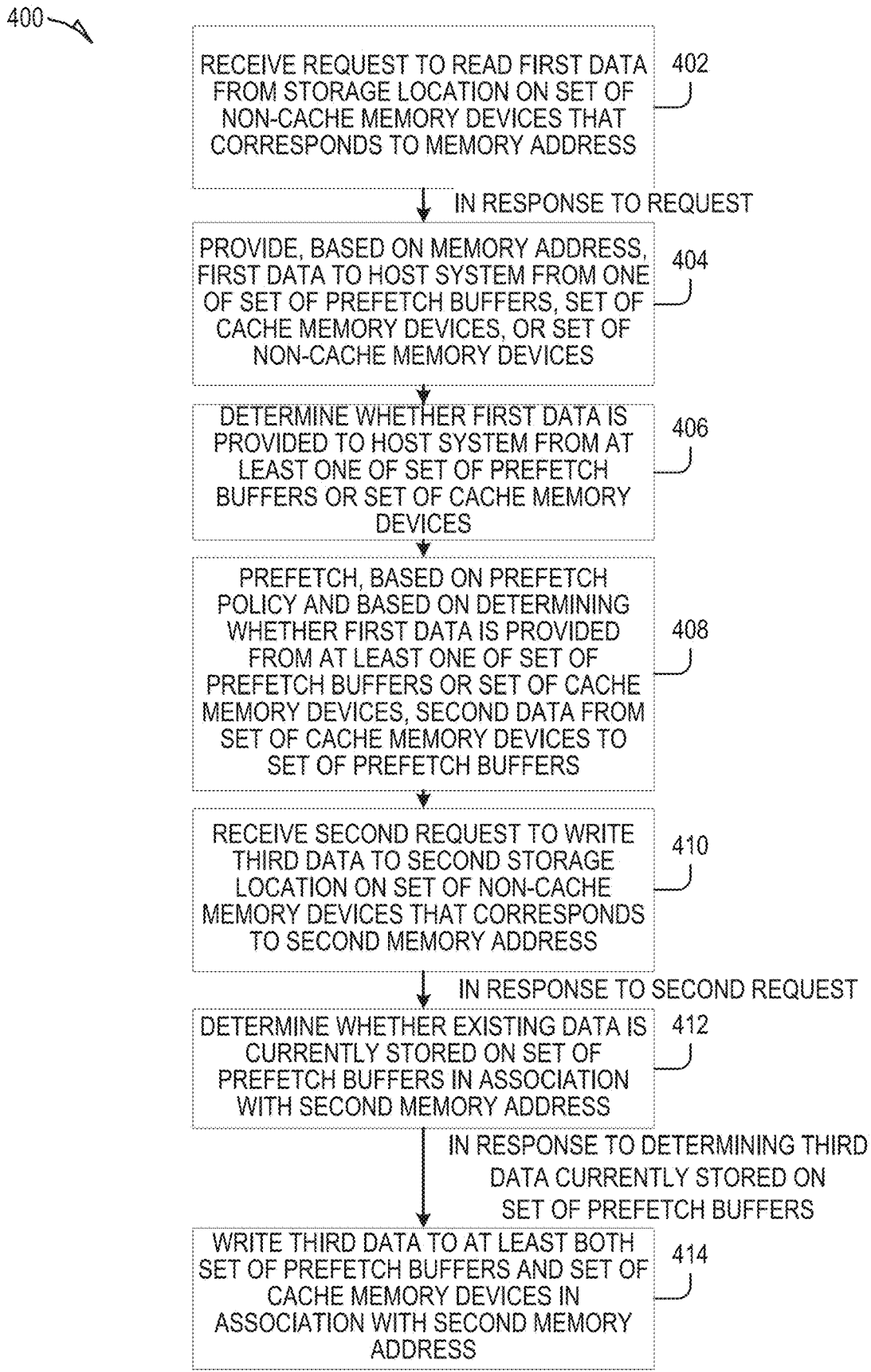

Referring now to the method 400 of FIG. 4, operations 402 through 408 are respectively similar to operations 302 through 308 described with respect to the method 300 of FIG. 3. At operation 410, the processing device (e.g., the processor 117) receives, from the host system (e.g., 120), a second request to write third data to second storage location on the set of non-cache memory devices (e.g., 130, 140) corresponding to a second memory address. For instance, the write request can be to overwrite or update the first data (provided by operation 404 in response to the request received by operation 402) with the third data.

At operation 412, the processing device (e.g., the processor 117) responds to the second request of operation 410 by determining whether existing data is currently stored on the set of prefetch buffers (e.g., determine whether the second request results in write hit on the prefetch buffer 150) in association with the second memory address.

At operation 414, the processing device (e.g., the processor 117) responds to the determination (by operation 412) that that existing data is currently stored on the set of prefetch buffers (e.g., 150) in association with the second memory address by writing the third data to at least both the set of prefetch buffers (e.g., 150) and the set of cache memory devices (e.g., 160) in association with the second memory address. For instance, the third data can be first written to the set of prefetch buffers, and then be written from the set of prefetch buffers to the set of cache memory devices. In this way, the prefetch buffer (e.g., 150) can operate as a write-through buffer for some embodiments.

Though not illustrated, for some embodiments, the processing device (e.g., the processor 117) receives an instruction from the host system (e.g., 120) to enable or disable prefetching of data (from the set of cache memory devices or the set of non-cache memory devices) to the set of prefetch buffers (e.g., 150). For example, where a host system (e.g., host-side software) determines that the host system is requesting more sequential reads than non-sequential reads (e.g., random access reads), the host system can send an instruction to the memory sub-system (e.g., and received by the processor 117) to enable prefetching of data to the set of prefetch buffers. Alternatively, where the host system (e.g., host-side software) determines that the host system is requesting more non-sequential reads (e.g., random access reads) than sequential reads, the host system can send an instruction to the memory sub-system (e.g., and received by the processor 117) to disable prefetching of data to the set of prefetch buffers.

Figure 5:
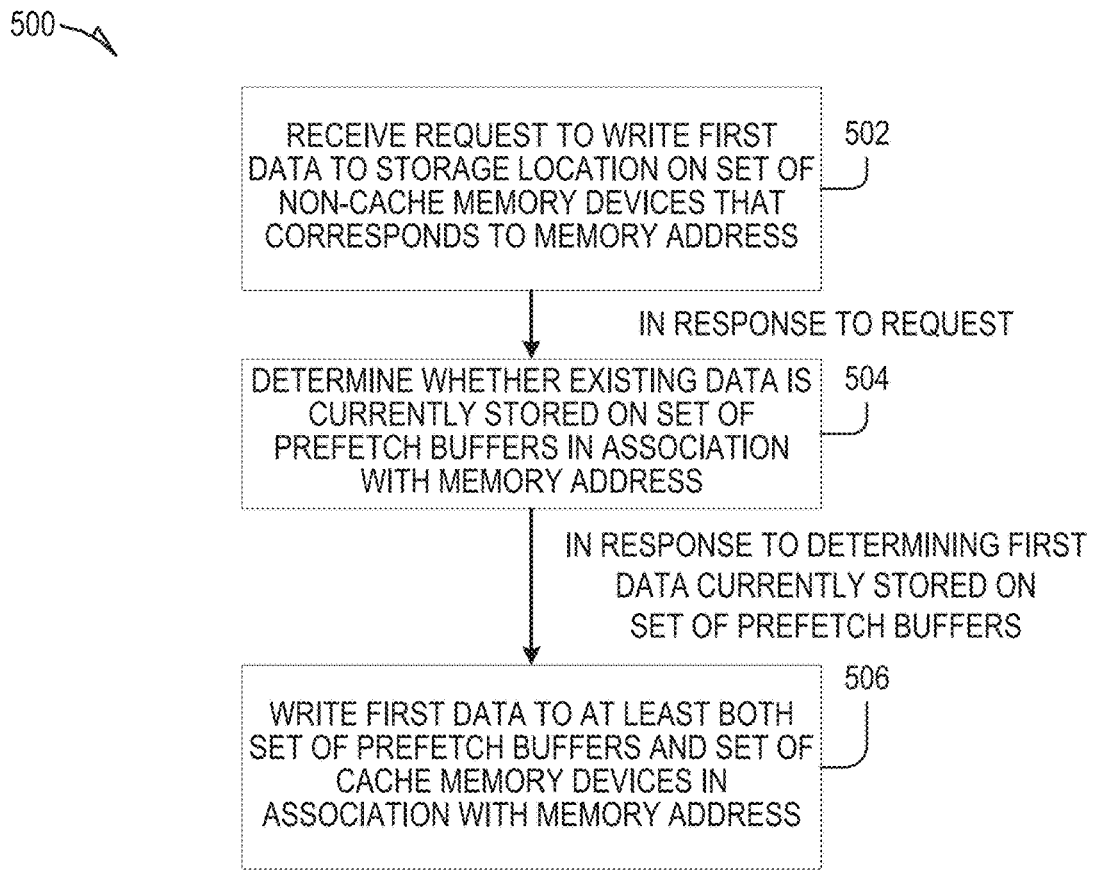

Referring now to the method 500 of FIG. 5, at operation 502, a processing device (e.g., the processor 117 of the memory sub-system controller 115) receives, from a host system (e.g., 120), a request to write first data to a storage location on a set of non-cache memory devices (e.g., 130, 140) that corresponds to a memory address. For some embodiments, the method 200 is performed with respect to a memory sub-system (e.g., 110) comprising a set of prefetch buffers (e.g., 150), a set of cache memory devices (e.g., 160), and the set of non-cache memory devices (e.g., 130, 140). Additionally, for some embodiments, the memory address is received from the host system in connection with, or as part of, the request received by operation 202.

At operation 504, the processing device (e.g., the processor 117) responds to the request of operation 502 by determining whether existing data is currently stored on the set of prefetch buffers (e.g., determine whether the request results in write hit on the prefetch buffer 150) in association with the memory address.

At operation 506, the processing device (e.g., the processor 117) responds to the determination (by operation 504) that existing data is currently stored on the set of prefetch buffers (e.g., 150) in association with the memory address by writing the first data to at least both the set of prefetch buffers (e.g., 150) and the set of cache memory devices (e.g., 160) in association with the memory address. For instance, the first data can be first written to the set of prefetch buffers, and then be written from the set of prefetch buffers to the set of cache memory devices. In this way, the prefetch buffer (e.g., 150) can operate as a write-through buffer for some embodiments.

Figure 6:
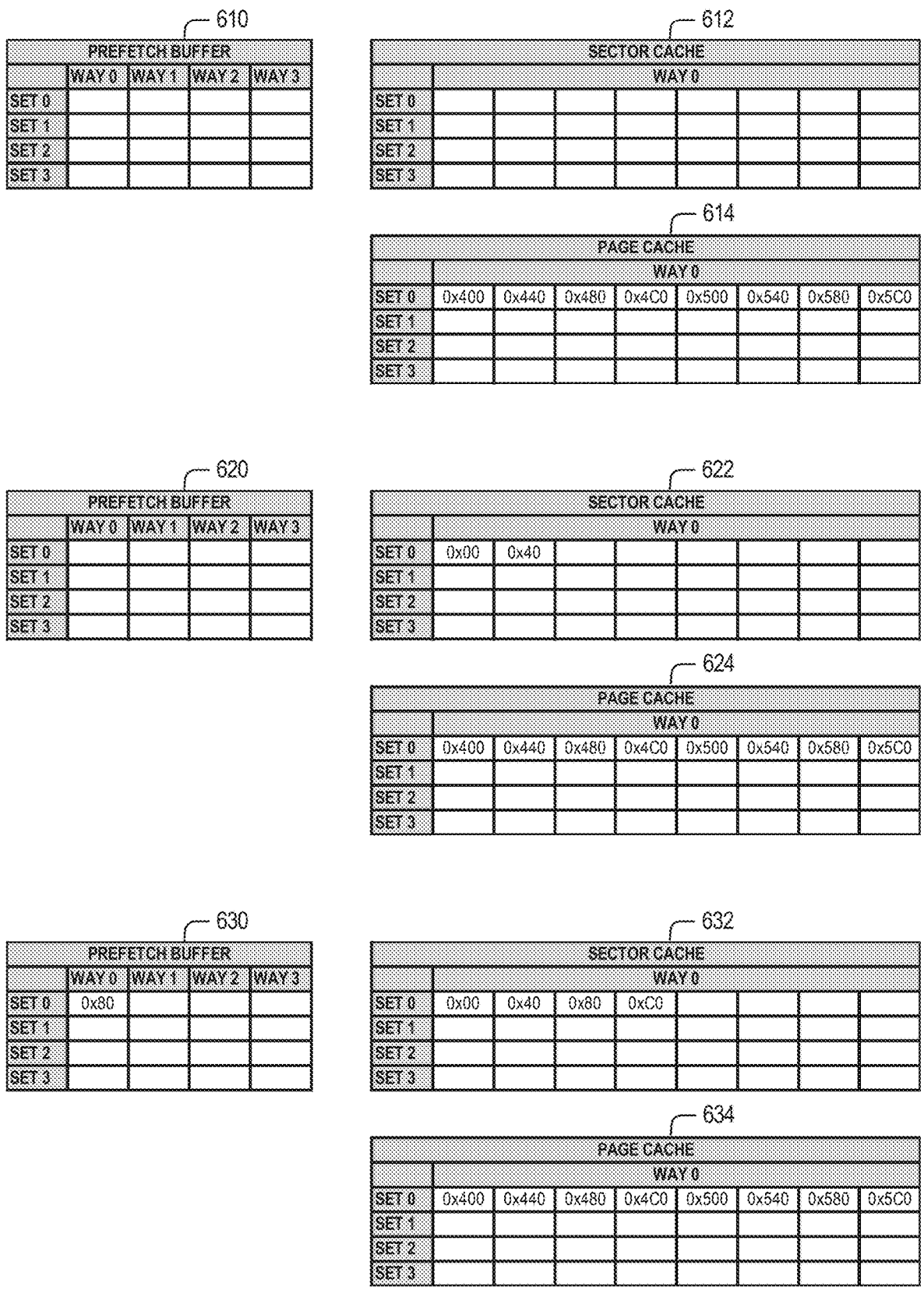
FIGS. 6 and 7 present tables illustrating example states of a prefetch buffer and cache memory devices of a memory sub-system during performance of one or more methods described herein.
Figure 7:
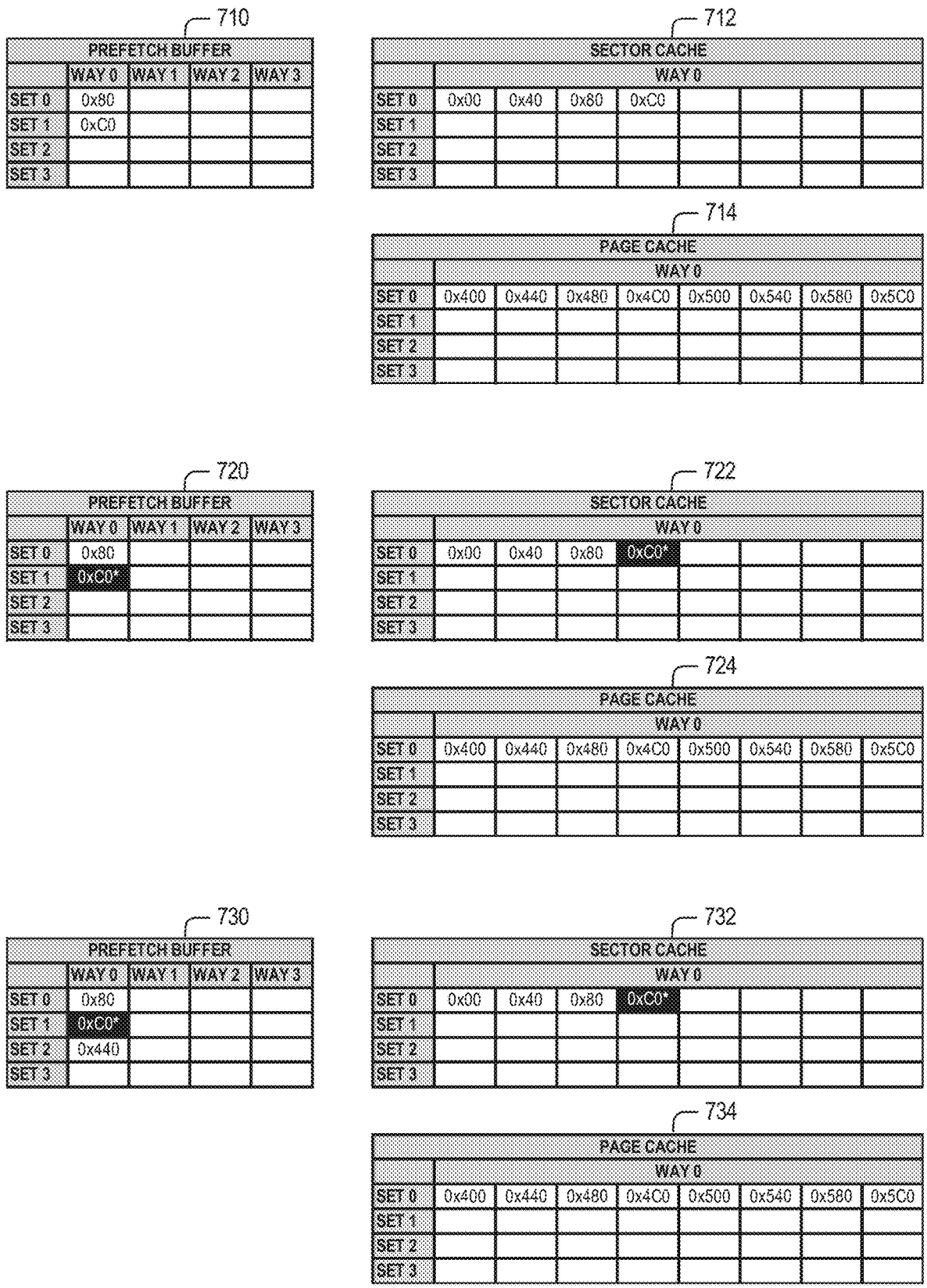

FIGS. 6 and 7 present tables illustrating example states of a prefetch buffer and cache memory devices of a memory sub-system during performance of one or more methods (e.g., 200, 300, 400, 500) described herein. As illustrated, for the examples of FIGS. 6 and 7, the memory sub-system comprises a cache memory device used for caching sector-size data fetched from a non-cache memory device of the memory sub-system (hereafter, referred to as the sector cache of the memory sub-system), and another cache memory device user for caching page-size data fetched from a non-cache memory device of the memory sub-system (hereafter, referred to as the page cache of the memory sub-system). For various embodiments, the size of data fetched from a non-cache memory device depends on the data read request received by the memory sub-system from a host system.

Referring now to FIG. 6, tables 610 and 612 illustrate that the prefetch buffer and the sector cache are initially empty, and table 614 illustrates that the page cache is currently storing page-size data from a range of sequential memory addresses (0x400 to 0x5C0). According to some embodiments, when the memory sub-system receives a request from the host system to read from memory address 0x00 on the set of non-cache memory devices, the memory sub-system searches the prefetch buffer, and then the sector and the page cache to determine whether the request results in a read hit or a read miss. In the current example, the memory sub-system would determine that the request results in a read miss on the prefetch buffer, a read miss on the sector cache, and a read miss on the page cache. In response to these read misses, the memory sub-system causes the requested data to be fetched to the sector cache from memory address (0x0) on the non-cache memory device, and also causes data from the next sequential memory address (0x40) on the non-cache memory device to be prefetched to the sector cache from the from the non-cache memory device in accordance with an example prefetch policy. Following the fetch (or following the fetch and prefetch), the memory sub-system can provide the data fetched from memory address 0x00 to the host system (e.g., provide the data in a response sent from the memory sub-system to the host system). Table 622 illustrates that the sector cache is now storing two valid sectors (0x00 and 0x40) after the fetch and prefetch. As shown by tables 620 and 624, the states of the prefetch buffer and the page cache remain unchanged after the fetch and prefetch.

Subsequently, when the memory sub-system receives a request from the host system to read from memory address 0x40 on the set of non-cache memory devices, the memory sub-system can again search the prefetch buffer, and then the sector and the page cache to determine whether the request results in a read hit or a read miss. In the current example, the memory sub-system would determine that the request results in a read miss on the prefetch buffer, a read hit on the sector cache, and a read miss on the page cache. In response to the read miss on the prefetch buffer and read hit on the sector cache, the memory sub-system causes the requested data to be provided to the host system from the sector cache, causes data from sectors of the next two sequential memory addresses (0x80 and 0xC0) on the non-cache memory device to be prefetched to the sector cache from the non-cache memory device, and causes data from the sector of the next sequential memory addresses (0x80) on the non-cache memory device to be prefetched to the prefetch buffer from the sector cache. Table 630 illustrates that the prefetch buffer is now storing a single valid sector (0x80), and table 632 illustrates that the sector cache is now storing two additional valid sectors (0x80 and 0xC0) after the fetch and prefetch. As shown by tables 634, the state of the page cache remains unchanged after the prefetches.

Thereafter, referring now to FIG. 7, when the memory sub-system receives a request from the host system to read from memory address 0x80 on the set of non-cache memory devices, the memory sub-system can again search the prefetch buffer, and then the sector and the page cache to determine whether the request results in a read hit or a read miss. In the current example, the memory sub-system would determine that the request results in a read hit on the prefetch buffer, a read hit on the sector cache, and a read miss on the page cache. In response to the read hit on the prefetch buffer, the memory sub-system causes the requested data to be provided to the host system from the prefetch buffer, and causes data from the sector of the next sequential memory addresses (0xC0) on the non-cache memory device to be prefetched to the prefetch buffer from the sector cache. Table 710 illustrates that the prefetch buffer is now storing another valid sector (0xC0). As shown by tables 712 and 714, the states of the sector cache and the page cache remain unchanged after the fetch and prefetch. Though not illustrated, depending on the embodiment, the memory sub-system could further respond by causing data from a sector of at least one next sequential memory address (e.g., 0x100) on the non-cache memory device to be prefetched to the sector cache from the non-cache memory device, by causing the sector cache to enable a most recently used (MRU) bit for the cache line, or both.

Next, assume that the memory sub-system then receives a request from the host system to write data to memory address 0xC0 on the set of non-cache memory devices. The memory sub-system can respond by searching the prefetch buffer, and then the sector and the page cache to determine whether the request results in a write hit or a write miss. In the current example, the memory sub-system would determine that the request results in a write hit on the prefetch buffer, a write hit on the sector cache, and a write miss on the page cache. In response to the read hit on the prefetch buffer and the read hit on the sector cache, the memory sub-system causes the data (write data) to be written to both the prefetch buffer and the sector cache. This reflected by tables 720 and 722, which show that 0xC0 is marked as dirty in both the prefetch buffer and the sector cache as result of the data writes. As shown by tables 724, the state of the page cache remains unchanged after the data writes.

Assuming that the memory sub-system then receives a request from the host system to read data from memory address 0x400 on the set of non-cache memory devices. The memory sub-system can respond by searching the prefetch buffer, and then the sector and the page cache to determine whether the request results in a read hit or a read miss. In the current example, the memory sub-system would determine that the request results in a read miss on the prefetch buffer, a read miss on the sector cache, and a read hit on the page cache. Accordingly, in response to the read hit on the page cache, the memory sub-system causes the requested data to be provided to the host system from the page cache, and causes data from the page of the next sequential memory addresses (0x440) on the non-cache memory device to be prefetched to the prefetch buffer from the page cache. Table 730 illustrates that the prefetch buffer is now storing a valid page (0x440) after the fetch and prefetch. As shown by tables 732 and 734, the states of the sector cache and the page cache remain unchanged after the fetch and prefetch.

Figure 8:
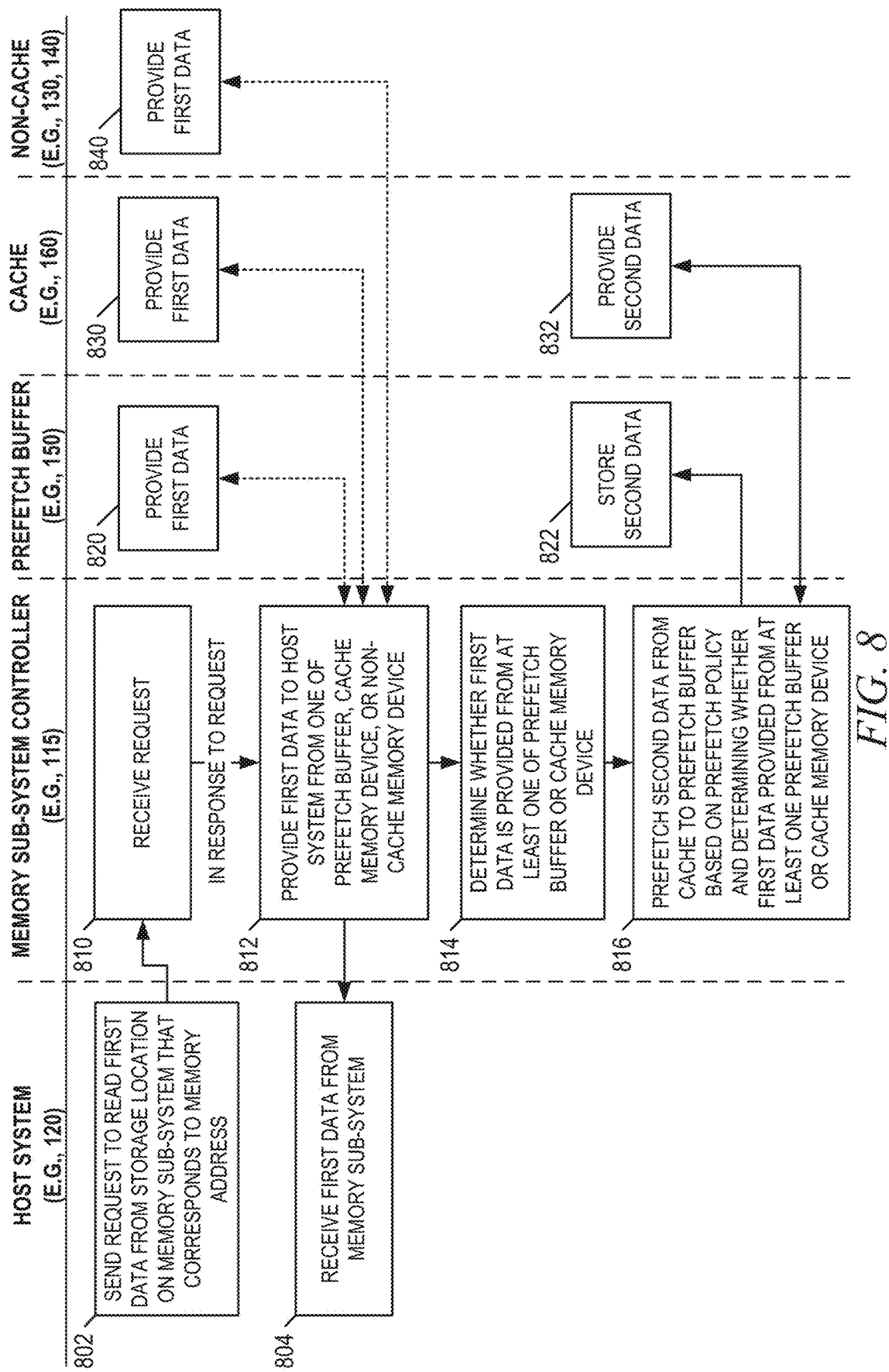
FIGS. 8 and 9 provide an interaction diagram illustrating interactions between components of a computing environment in the context of some embodiments in which a method of using a prefetch buffer as described herein is performed.
Figure 9:
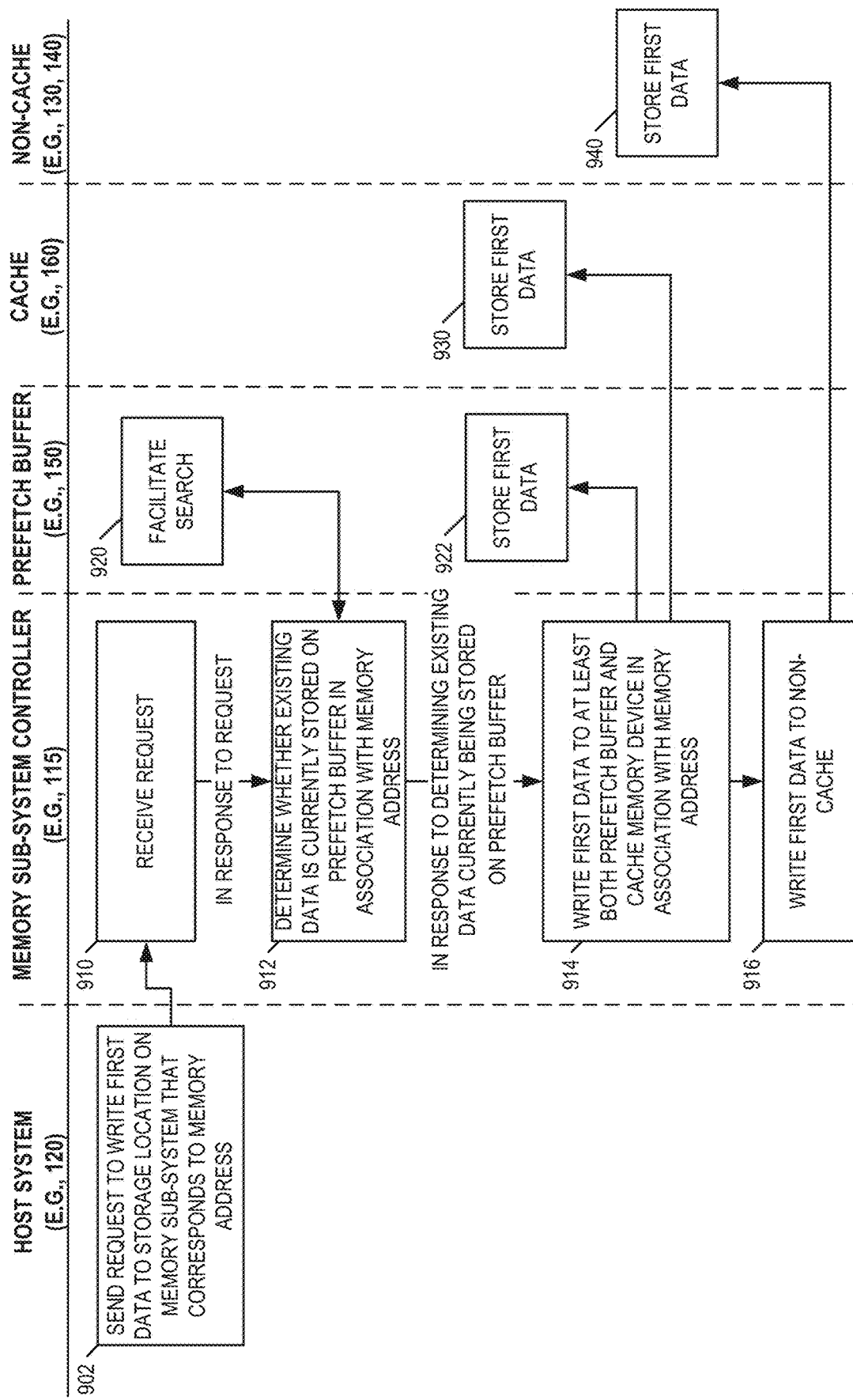

FIGS. 8 and 9 provide an interaction diagram illustrating interactions between components of the computing environment 100 in the context of some embodiments in which a method of using a prefetch buffer as described herein is performed. The operations of the method can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, the method is performed by a host system (e.g., 120), a memory sub-system controller (e.g., 115), a memory device (e.g., 130, 140), or some combination thereof. Although the operations are shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. In the context of the example illustrated in FIGS. 8 and 9, the host system can include the host system 120, the memory sub-system controller can include the memory sub-system controller 115, the prefetch buffer can include the prefetch buffer 150, the cache can include the cache memory device 160, and the non-cache can include the memory device 130 or 140.

As shown in FIG. 8, at operation 802, the host system 120 sends a request to read first data from a storage location on the memory sub-system 110 that corresponds to a memory address of the memory sub-system 110. At operation 810, the memory sub-system controller 115 receives the request. In response to the request, at operation 812, the memory sub-system controller 115 (based on the memory address provided with the request) provides the first data to the host system 120 from one of the prefetch buffer 150, the cache memory device 160, or the non-cache memory device (e.g., 130 or 140). Based on the request, operation 812 can comprise searching the prefetch buffer 150 for a read hit on the memory address of the request, and then searching the cache memory device 160 for a read hit on the memory address of the request. If a read hit results on the prefetch buffer 150, at operation 820 the prefetch buffer 150 provides the memory sub-system controller 115 with the requested first data for the host system 120. If a read miss results on the prefetch buffer 150 and a read hit results on the cache memory device 160, at operation 830, the cache memory device 160 provides the memory sub-system controller 115 with the requested first data for the host system 120. If, however, a read miss results on both the prefetch buffer 150 and the cache memory device 160, at operation 840 the non-cache memory device 130, 140 provides the memory sub-system controller 115 with the requested first data for the host system 120. Eventually, at operation 804, the host system 120 receives the first data from the memory sub-system 110.

At operation 814, the memory sub-system controller 115 determines whether the first data is provided from at least one of the prefetch buffer 150 or the cache memory device 160. Based on a prefetch policy and the determination of operation 814, at operation 816, the memory sub-system controller 115 prefetches second data from the cache memory device 160 to the prefetch buffer 150. Accordingly, at operation 832, the cache memory device 160 provides the second data for the prefetch and, at operation 822, the prefetch buffer 150 stores the second data prefetched from the cache memory device 160.

Referring now to FIG. 9, at operation 902, the host system 120 sends a request to write first data to a storage location on the memory sub-system 110 that corresponds to a memory address of the memory sub-system 110. At operation 910, the memory sub-system controller 115 receives the request. In response to the request, at operation 912, the memory sub-system controller 115 (based on the memory address provided with the request) determines whether existing data is currently stored on the prefetch buffer 150 in association with the memory address. In order for the memory sub-system controller 115 to determine whether existing data is currently stored on the prefetch buffer 150 in association with the memory address, at operation 920, the prefetch buffer 150 facilitates a search of the prefetch buffer 150 for data in association with the memory address (e.g., search for tags).

In response to determining that the existing data is currently stored on the prefetch buffer 150, at operation 914, the memory sub-system controller 115 writes the first data to at least both the prefetch buffer 150 and the cache memory device 160 in association with the memory device 110. In response to operation 914, at operation 922, the prefetch buffer 150 stores the first data, and at operation 930, the cache memory device 160 stores the first data. At operation 916, the memory sub-system controller 115 writes the first data to the non-cache memory device (e.g., 130, 140). At operation 940, the non-cache memory device 130, 140 stores the first data in response to operation 916.

Figure 10:
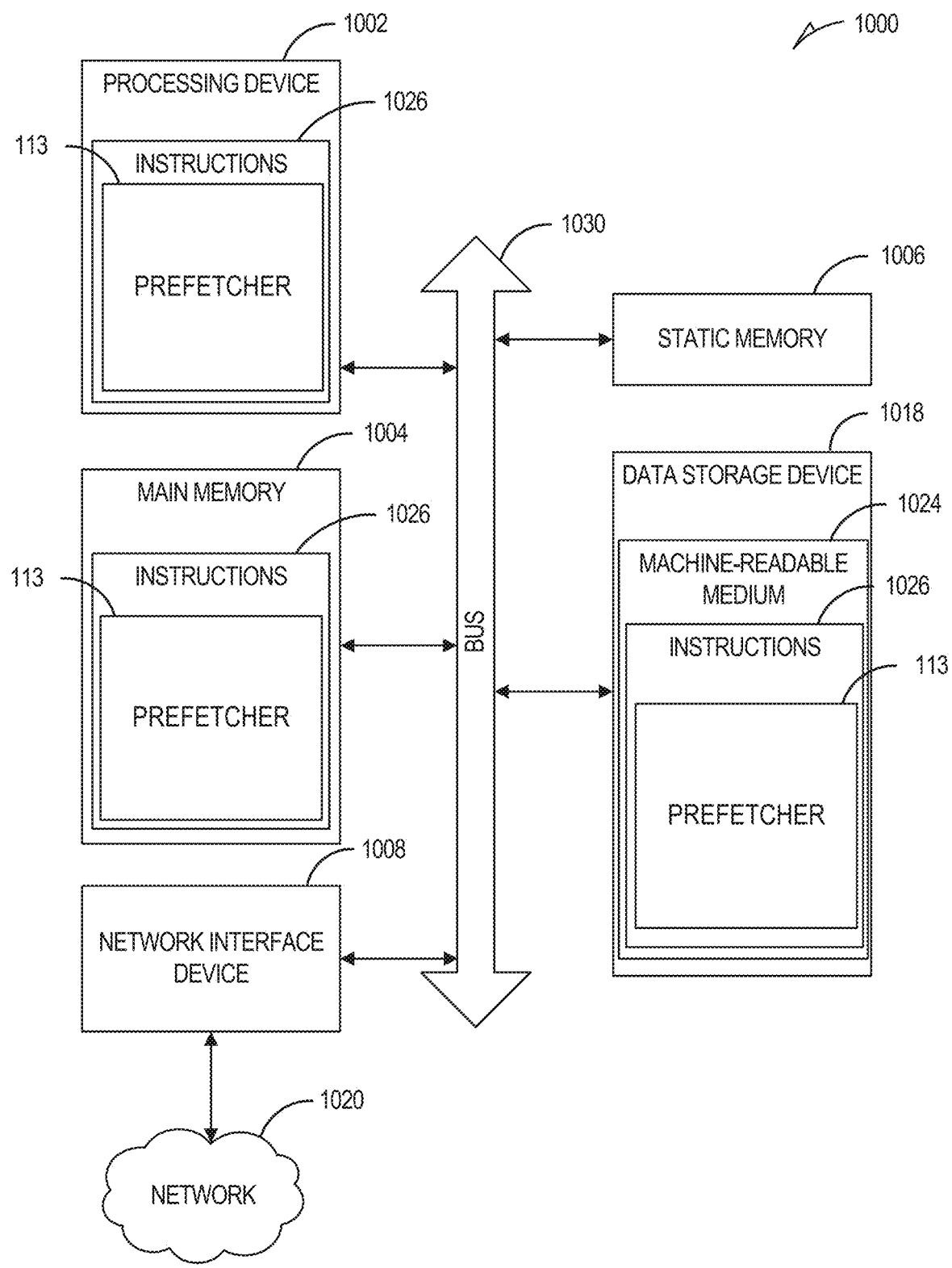
FIG. 10 is a block diagram of an example computer system in which embodiments of the present disclosure may operate.

FIG. 10 illustrates an example machine in the form of a computer system 1000 within which a set of instructions can be executed for causing the machine to perform any one or more of the methodologies discussed herein. In some embodiments, the computer system 1000 can correspond to a host system (e.g., the host system 120 of FIG. 1) that includes, is coupled to, or utilizes a memory sub-system (e.g., the memory sub-system 110 of FIG. 1) or can be used to perform the operations described herein. In alternative embodiments, the machine can be connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a tablet PC, a set-top box (STB), a personal digital assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1000 includes a processing device 1002, a main memory 1004 (e.g., read-only memory (ROM), flash memory, dynamic random access memory (DRAM) such as synchronous DRAM (SDRAM) or Rambus DRAM (RDRAM), etc.), a static memory 1006 (e.g., flash memory, static random access memory (SRAM), etc.), and a data storage device 1018, which communicate with each other via a bus 1030.

The processing device 1002 represents one or more general-purpose processing devices such as a microprocessor, a central processing unit, or the like. More particularly, the processing device 1002 can be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 1002 can also be one or more special-purpose processing devices such as an application specific integrated circuit (ASIC), a field programmable gate array (FPGA), a digital signal processor (DSP), a network processor, or the like. The processing device 1002 is configured to execute instructions 1026 for performing the operations and steps discussed herein. The computer system 1000 can further include a network interface device 1008 to communicate over a network 1020.

The data storage device 1018 can include a machine-readable storage medium 1024 (also known as a computer-readable medium) on which is stored one or more sets of instructions 1026 or software embodying any one or more of the methodologies or functions described herein. The instructions 1026 can also reside, completely or at least partially, within the main memory 1004 and/or within the processing device 1002 during execution thereof by the computer system 1000, the main memory 1004 and the processing device 1002 also constituting machine-readable storage media. The machine-readable storage medium 1024, data storage device 1018, and/or main memory 1004 can correspond to the memory sub-system 110 of FIG. 1.

In one embodiment, the instructions 1026 include instructions to implement functionality corresponding to using a prefetch buffer as described herein (e.g., the prefetcher 113 of FIG. 1). While the machine-readable storage medium 1024 is shown, in an example embodiment, to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
a set of prefetch buffers;
a set of cache memory devices;
a set of non-cache memory devices; and
a processing device, operatively coupled to the set of prefetch buffers, the set of cache memory devices, and the set of non-cache memory devices, the processing device configured to perform operations comprising:
receiving, from a host system, a request to read first data from a storage location on the set of non-cache memory devices that corresponds to a memory address; and
in response to the request:
providing, based on the memory address, the first data to the host system from one of the set of prefetch buffers, the set of cache memory devices, or the set of non-cache memory devices;
determining whether the first data is provided to the host system from at least one of the set of prefetch buffers or the set of cache memory devices; and
prefetching, based on a prefetch policy and based on the determining whether the first data is provided to the host system from at least one of the set of prefetch buffers or the set of cache memory devices, second data from the set of cache memory devices to the set of prefetch buffers, the second data being stored on the set of non-cache memory devices at a set of storage locations corresponding to a set of sequential memory addresses, and the set of sequential memory addresses sequentially following the memory address.

2. The system of claim 1, wherein the prefetching, based on the prefetch policy and based on the determining whether the first data is provided to the host system from at least one of the set of prefetch buffers or the set of cache memory devices, the second data from the set of cache memory devices to the set of prefetch buffers comprises:
in response to determining that the first data is provided to the host system from the set of cache memory devices;
copying at least the second data, from the set of storage locations on the set of non-cache memory devices corresponding to the set of sequential memory addresses, to the set of cache memory devices; and
copying the second data from the set of cache memory devices to the set of prefetch buffers.

3. The system of claim 1, wherein the prefetching, based on the prefetch policy and based on the determining whether the first data is provided to the host system from at least one of the set of prefetch buffers or the set of cache memory devices, the second data from the set of cache memory devices to the set of prefetch buffers comprises:
in response to determining that the first data is provided to the host system from the set of prefetch buffers:
copying the second data from the set of cache memory devices to the set of prefetch buffers.

4. The system of claim 3, wherein further in response to the first data being provided to the host system from the set of prefetch buffers:
copying third data, from a second set of storage locations on the set of non-cache memory devices corresponding to a second set of sequential memory addresses, to the set of cache memory devices, the second set of sequential memory addresses sequentially following the set of sequential memory addresses.

5. The system of claim 1, wherein the providing the first data to the host system, from one of the set of prefetch buffers, the set of cache memory devices, or the set of non-cache memory devices, based on the memory address comprises:
  determining, based on the memory address, whether the first data is currently stored on the set of prefetch buffers; and
  in response to determining that the first data is currently stored on the set of prefetch buffers, providing the first data from the set of prefetch buffers to the host system.

6. The system of claim 1, wherein the providing the first data to the host system, from one of the set of prefetch buffers, the set of cache memory devices, or the set of non-cache memory devices, based on the memory address comprises:
  determining, based on the memory address, whether the first data is currently stored on the set of prefetch buffers; and
  in response to determining that the first data is not stored on the set of prefetch buffers, determining, based on the memory address, whether the first data is currently stored on the set of cache memory devices.

7. The system of claim 6, wherein the determining, based on the memory address, whether the first data is currently stored on the set of cache memory devices comprises:
  determining whether the request to read the first data comprises a request to read a sector of data from the storage location on the set of non-cache memory devices; and
  in response to determining that the request to read the first data comprises the request to read the sector of data from the storage location, determining whether the first data is currently stored on a cache memory device, of the set of cache memory devices, for caching one or more sectors from the set of non-cache memory devices.

8. The system of claim 6, wherein the determining, based on the memory address, whether the first data is currently stored on the set of cache memory devices comprises:
  determining whether the request to read the first data comprises a request to read a page of data from the storage location on the set of non-cache memory devices; and
  in response to determining that the request to read the first data comprises the request to read the page of data from the storage location, determining whether the first data is currently stored on a cache memory device, of the set of cache memory devices, for caching one or more pages from the set of non-cache memory devices.

9. The system of claim 6, wherein the providing the first data to the host system, from one of the set of prefetch buffers, the set of cache memory devices, or the set of non-cache memory devices, based on the memory address further comprises:
  in response to determining that the first data is currently stored on the set of cache memory devices, providing the first data from the set of cache memory devices to the host system.

10. The system of claim 6, wherein the providing the first data to the host system, from one of the set of prefetch buffers, the set of cache memory devices, or the set of non-cache memory devices, based on the memory address further comprises:
  in response to determining that the first data is not stored on the set of cache memory devices:
    fetching the first data from the set of non-cache memory devices to the set of cache memory devices; and
    providing the first data from the set of cache memory devices to the host system.

11. The system of claim 1, wherein the set of cache memory devices comprises at least one cache memory device for caching one or more sectors from the set of non-cache memory devices.

12. The system of claim 1, wherein the set of cache memory devices comprises at least one cache memory device for caching one or more pages from the set of non-cache memory devices.

13. The system of claim 1, wherein the set of cache memory devices comprises a set of volatile memory devices, and the set of non-cache memory devices comprises a set of non-volatile memory devices.

14. The system of claim 1, wherein the set of prefetch buffers comprises at least one of a set of static random-access memory (SRAM) devices, a set of hardware registers, and a set of set-associative caches.

15. The system of claim 14, wherein the set of cache memory devices comprises a set of dynamic random-access memory (DRAM) devices.

16. The system of claim 1, wherein the set of non-cache memory devices comprises a set of NAND-type memory devices.

17. The system of claim 1, wherein the operations further comprise:
  receiving, from the host system, a second request to write third data to a second storage location on the set of non-cache memory devices corresponding to a second memory address; and
  in response to the second request:
  determining whether existing data is currently stored on the set of prefetch buffers in association with the second memory address; and
  in response to determining that existing data is currently stored on the set of prefetch buffers in association with the second memory address, writing the third data to at least both the set of prefetch buffers and the set of cache memory devices in association with the memory address.

18. The system of claim 1, wherein the operations further comprise:
  receiving an instruction from the host system to enable or disable prefetching of data from the set of cache memory devices to the set of prefetch buffers.

19. A method comprising:
  receiving, at a memory sub-system from a host system, a request to read first data from a storage location on a set of non-cache memory devices that corresponds to a memory address, the memory sub-system comprising a set of prefetch buffers, a set of cache memory devices, and the set of non-cache memory devices; and
  in response to the request:
    determining, by the memory sub-system, whether the first data is stored on at least one of the set of prefetch buffers or the set of cache memory devices; and
    prefetching, based on a prefetch policy and based on the determining whether the first data is stored on the set of prefetch buffers or the set of cache memory devices, second data from the set of cache memory devices to the set of prefetch buffers, the second data being stored on the set of non-cache memory devices at a set of storage locations corresponding to a set of sequential memory addresses, and the set of sequential memory addresses sequentially following the memory address.

20. At least one machine-readable medium comprising instructions that, when executed by a processing device of a memory sub-system, cause the processing device to perform operations comprising:

receiving a request to read first data from a storage location on a set of non-cache memory devices that corresponds to a memory address, the memory sub-system comprising a set of prefetch buffers, a set of cache memory devices, and the set of non-cache memory devices; and in response to the request:

determining whether the first data is stored on at least one of the set of prefetch buffers or the set of cache memory devices; and prefetching, based on a prefetch policy and based on the determining whether the first data is stored on the set of prefetch buffers or the set of cache memory devices, second data from the set of cache memory devices to the set of prefetch buffers, the second data being stored on the set of non-cache memory devices at a set of storage locations corresponding to a set of sequential memory addresses, and the set of sequential memory addresses sequentially following the memory address.

* * * * *